United States Patent
He et al.

(10) Patent No.: US 9,170,951 B1
(45) Date of Patent: Oct. 27, 2015

(54) METHOD AND APPARATUS FOR EVENT/ALERT ENRICHMENT

(75) Inventors: Lida He, Sleepy Hollow, NY (US); Erkan Oztekin, Bayside, NY (US); Thulasinathan Kandasamy, Karnataka (IN); Cheuk Lam, Yorktown Heights, NY (US)

(73) Assignee: EMC Corporation, Hopkinton, MA (US)

( * ) Notice: Subject to any disclaimer, the term of this patent is extended or adjusted under 35 U.S.C. 154(b) by 297 days.

(21) Appl. No.: 13/435,017

(22) Filed: Mar. 30, 2012

(51) Int. Cl.
*G06F 9/54* (2006.01)
*G06F 12/08* (2006.01)

(52) U.S. Cl.
CPC .................................. *G06F 12/0844* (2013.01)

(58) Field of Classification Search
CPC ............ H04L 67/1097; G06F 2201/86; G06F 11/079; Y04S 40/166
See application file for complete search history.

(56) References Cited

U.S. PATENT DOCUMENTS

| | | | |
|---|---|---|---|
| 6,249,755 | B1 | 6/2001 | Yemini et al. |
| 8,117,306 | B1 * | 2/2012 | Baumback et al. ............ 709/224 |
| 2004/0049572 | A1 * | 3/2004 | Yamamoto et al. ........... 709/224 |
| 2012/0151025 | A1 * | 6/2012 | Bailey et al. ................... 709/223 |
| 2012/0221314 | A1 | 8/2012 | Bourlatchkov et al. |
| 2012/0297061 | A1 | 11/2012 | Pedigo et al. |
| 2013/0166724 | A1 | 6/2013 | Bairavasundaram et al. |

OTHER PUBLICATIONS

INetU, Understanding Cloud Storage—SAN, NAS, and DAS Mar. 12, 2012, p. 1-5.*
U.S. Appl. No. 13/536,512, filed Jun. 28, 2012, Zhang, et al.
U.S. Appl. No. 13/536,726, filed Jun. 28, 2012, Lam, et al.
U.S. Appl. No. 13/628,706, filed Sep. 27, 2012, Lam, et al.
Vblock Infrastructure Platforms Series 300 Architecture Overview, Version 2.4, Aug. 2011, The Virtual Computing Environment Company, www.vce.com, 74 pages.
Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.
EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.

(Continued)

*Primary Examiner* — H S Sough
*Assistant Examiner* — Syed Roni
(74) *Attorney, Agent, or Firm* — Daly, Crowley, Mofford & Durkee, LLP

(57) ABSTRACT

Methods and apparatus to provide alert enrichment in a cloud storage system. In one embodiment, the system performs alert/event identification with information from an identity matching service for the components of the cloud storage system to generate a resource identifier for the component associated with a first one of the processed alerts/events, and use the resource identifier to identify a service, platform, virtual machine, virtual application, virtual data center, organization and/or platform component associate with the first one of the processed alerts/events.

17 Claims, 15 Drawing Sheets

(56) References Cited

OTHER PUBLICATIONS

VMware vStorage APIs for Array Integration With EMC VNX Series for NAS, Benefits of EMC VNX for File Integration With VMware VAAI, White Paper, EMC Solutions Group, Jan. 2012, EMC², 17 pages.

Vblock™ Infrastructure Platforms 2010 Vblock Platforms Architecture Overview, Version 1.3, Nov. 2011, The Virtual Computing Environment Company, www.vce.com, 25 pages.

Best Practices for Deploying VMware vCloud Director on Vblock Infrastructure Platforms, Sep. 2011, The Virtual Computing Environment Company, www.vce.com, 20 pages.

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © VCE Company, The Virtual Computing Environment Company, www.vce.com, 3 pages.

Vblock™ Infrastructure Platforms Technical Overview, © 2011 VCE Company, The Virtual Computing Environment Company, www.vce.com, 8 pages.

Vblock™ Solution for Trusted Multi-Tenancy: Technical Overview, Aug. 2011, The Virtual Computing Environment Company, www.vce.com, 75 pages.

U.S. Appl. No. 13/536,512, filed Jun. 28, 2013, 83 pages.

U.S. Appl. No. 13/536,726, filed Jun. 28, 2012, 73 pages.

U.S. Appl. No. 13/628,708, filed Sep. 27, 2012, 120 pages.

U.S. Appl. No. 13/536,512 Office Action dated May 15, 2014, 19 pages.

* cited by examiner

METHOD AND APPARATUS FOR EVENT/ALERT ENRICHMENT

BACKGROUND

As is known in the art, storage systems, such as so-called, cloud storage systems, contain a large number of hardware devices and components and software applications, modules, and component. In the presence of a fault, alert, or other condition needing attention, it can be difficult to identify the source of the fault or alert since there are many complex components that may be provided by multiple vendors which may make it difficult to exchange information in an efficient manner.

For example, in a cloud storage environment, alerts and events from various event sources in platforms normally contain limited information that may not be meaningful and may seem unrelated to the environment from which they originate. It is challenging for IT personnel to extract executable data from the alerts and take appropriate action.

With large volumes of alerts/events constantly coming from various sources, it is challenging to prioritize the alerts/events and take proper actions without putting the alerts or events in the proper context, such as organizations/business units, impacted applications, etc. It is time consuming to trouble-shoot events/alerts, errors, etc., without associating the alerts and events with their relevant physical or logical topology resources or assets. In addition, many of the IT resources are managed in silos by IT personnel specialized in certain technology domains. For example, when a blade in the Cisco Unified Computing System (UCS) fails or has performance issues its impact propagates to the ESX server deployed on the blade, to the virtual machines deployed on the ESX server, to the applications or critical services running on those virtual machines, to the critical business that relies on those services. It may take hours or even days to sort through those alerts or events, which may result in significant detrimental impact on an enterprise.

SUMMARY

In one aspect of the invention, a method comprises receiving alerts/events from components of a cloud storage system, processing, using a computer processor, raw data for the alerts/events, performing alert/event identification with information from an identity matching service for the components of the cloud storage system to generate a resource identifier for the component associated with a first one of the processed alerts/events, and using the resource identifier to identify a service, platform, virtual machine, virtual application, virtual data center, organization and/or platform component associate with the first one of the processed alerts/events.

In another aspect of the invention, an article comprises a computer readable medium having non-transitory stored instructions that enable a machine to perform: receiving alerts/events from components of a cloud storage system, processing, using a computer processor, raw data for the alerts/events, performing alert/event identification with information from an identity matching service for the components of the cloud storage system to generate a resource identifier for the component associated with a first one of the processed alerts/events, and using the resource identifier to identify a service, platform, virtual machine, virtual application, virtual data center, organization and/or platform component associate with the first one of the processed alerts/events.

In a further aspect of the invention, a system comprises a cloud storage system comprising: a computer layer, a storage layer, a network layer coupled between the compute and storage layer, and a management layer to control the system, the management layer comprising stored instructions to enable the management layer to: receive alerts/events from components of the cloud storage system, process raw data for the alerts/events, perform alert/event identification with information from an identity matching service for the components of the cloud storage system to generate a resource identifier for the component associated with a first one of the processed alerts/events, and use the resource identifier to identify a service, platform, virtual machine, virtual application, virtual data center, organization and/or platform component associate with the first one of the processed alerts/events.

BRIEF DESCRIPTION OF THE DRAWINGS

The foregoing features of this invention, as well as the invention itself, may be more fully understood from the following description of the drawings in which:

FIG. 9 is an exemplary display of an alert enriched with logical service;

FIGS. 13A and 13B show a datastore alert enriched with organization; and

DETAILED DESCRIPTION

Figure 1:
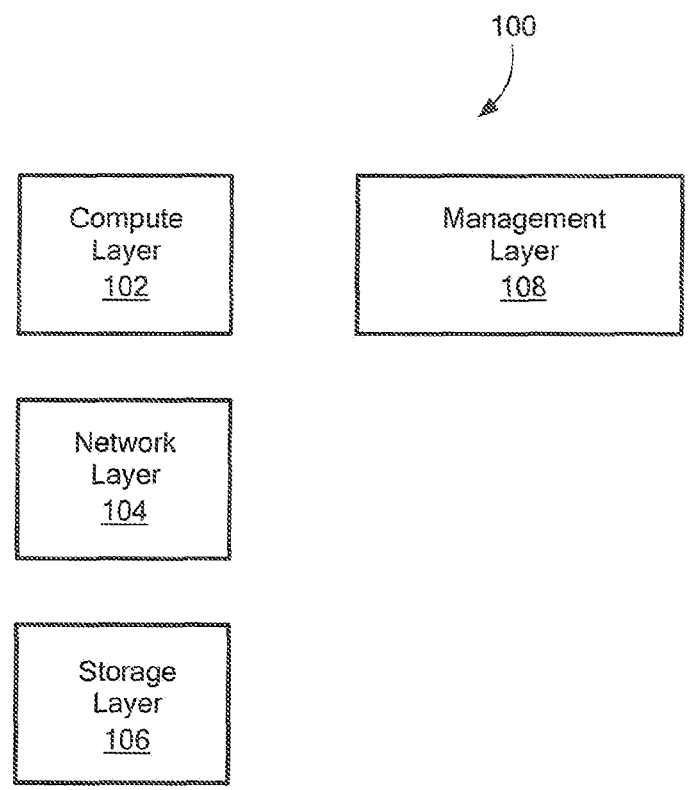
FIG. 1 is a high level schematic representation of a cloud storage system having alert enrichment in accordance with exemplary embodiments of the invention.

FIG. 1 shows an exemplary cloud storage environment 100 having alert enrichment in accordance with exemplary embodiments of the invention. The environment includes a compute layer 102, a network layer 104, a storage layer 106, and a management layer 108. The environment may be referred to as a platform. It is understood that any practical number of platforms can be combined into a cloud storage environment.

The compute layer 102 comprises components, such as blade servers, chassis and fabric interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
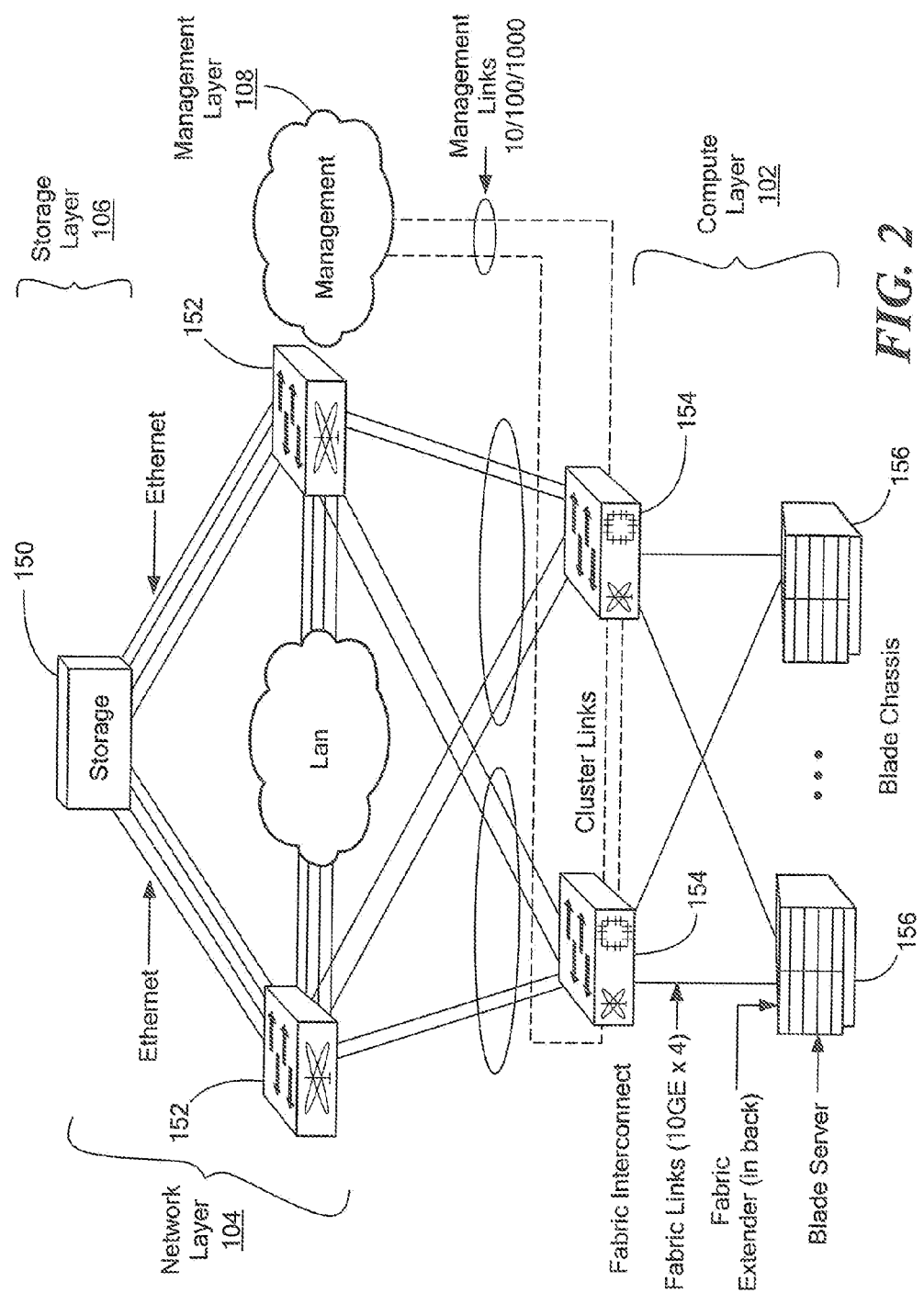
FIG. 2 is a schematic representation showing further detail of the cloud storage system of FIG. 1 including interconnections.

FIG. 2 shows further detail for the environment 100 of FIG. 1. The storage layer 106 can include storage components 150, such as CLARIION storage components from EMC Corporation of Hopkinton Mass. The network layer 104 can include a pair of switches 152, such as MDS 9000 Series Multilayer SAN Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
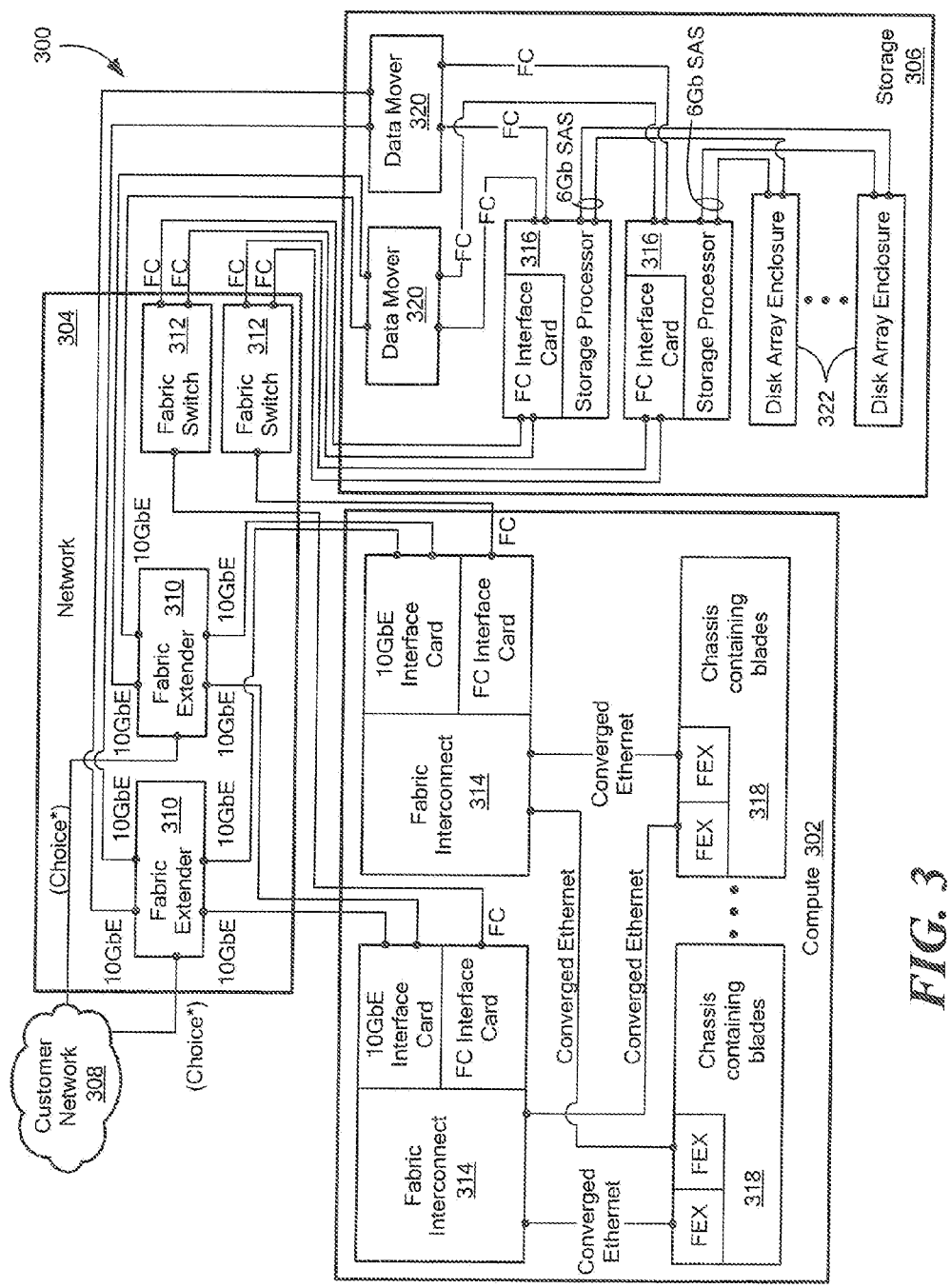
FIG. 3 is a schematic representation showing further detail of the cloud storage system if FIG. 2 including system components.
Figure 4:
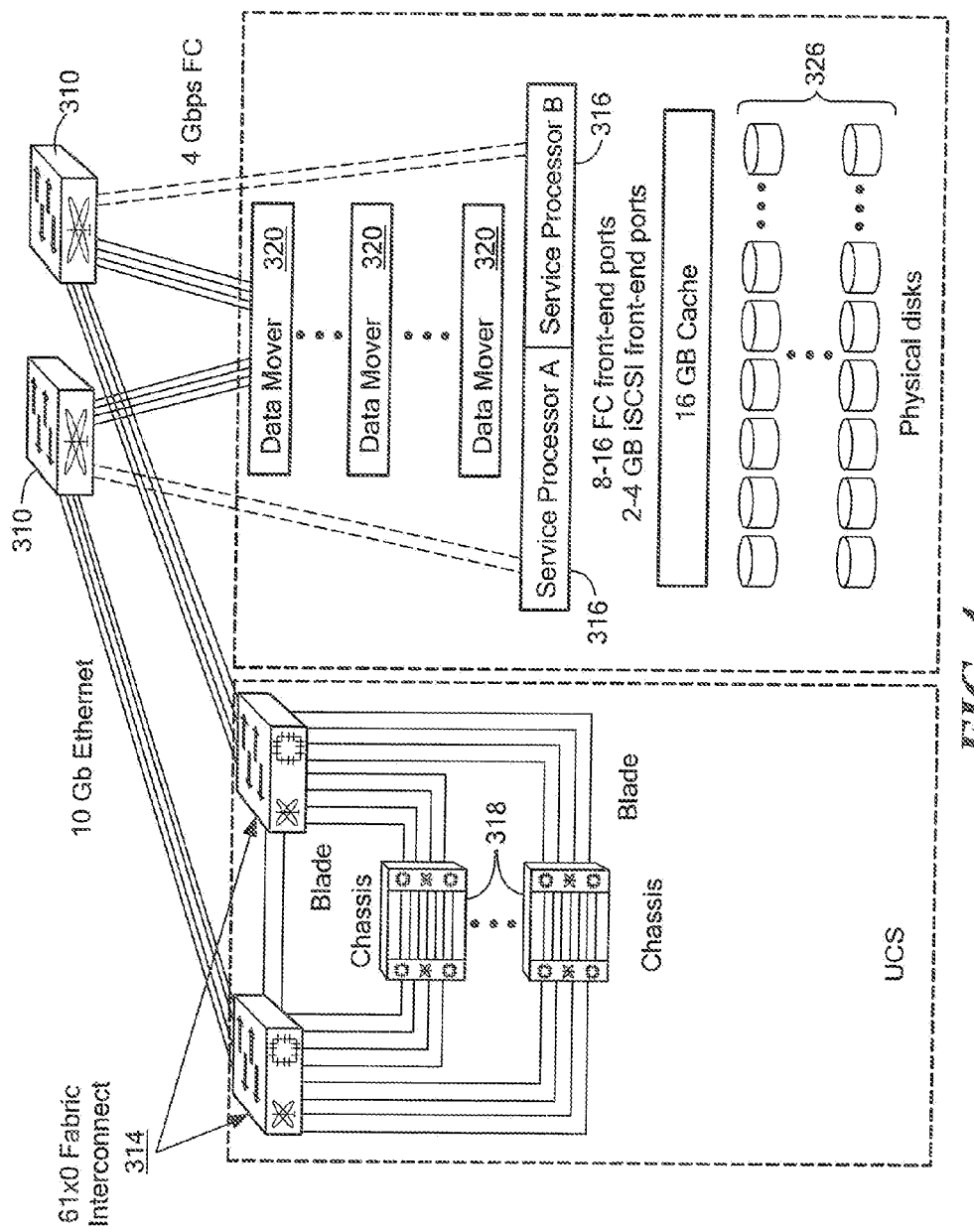
FIG. 4 is a schematic representation showing further detail of a storage layer of the cloud storage system of FIG. 3 using NAS for the storage layer.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports.

It is understood that a variety of other configurations having different interconnections and storage configuration can be provided to meet the needs of a particular application.

The management layer can include a number of applications to perform various functions for overall control, configuration, etc of the various platform components. For example, management applications can include a virtualization function, such as VSPHERE/VCENTER, by VMware of Palto Alto, Calif. A further management application can be provided as the Unified Computing System (UCS) by Cisco. It is understood that the blade chassis and fabric interconnection can be considered part of the UCS. Another management application can includes a management interface, such as EMC UNISPHERE, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

Figure 5:
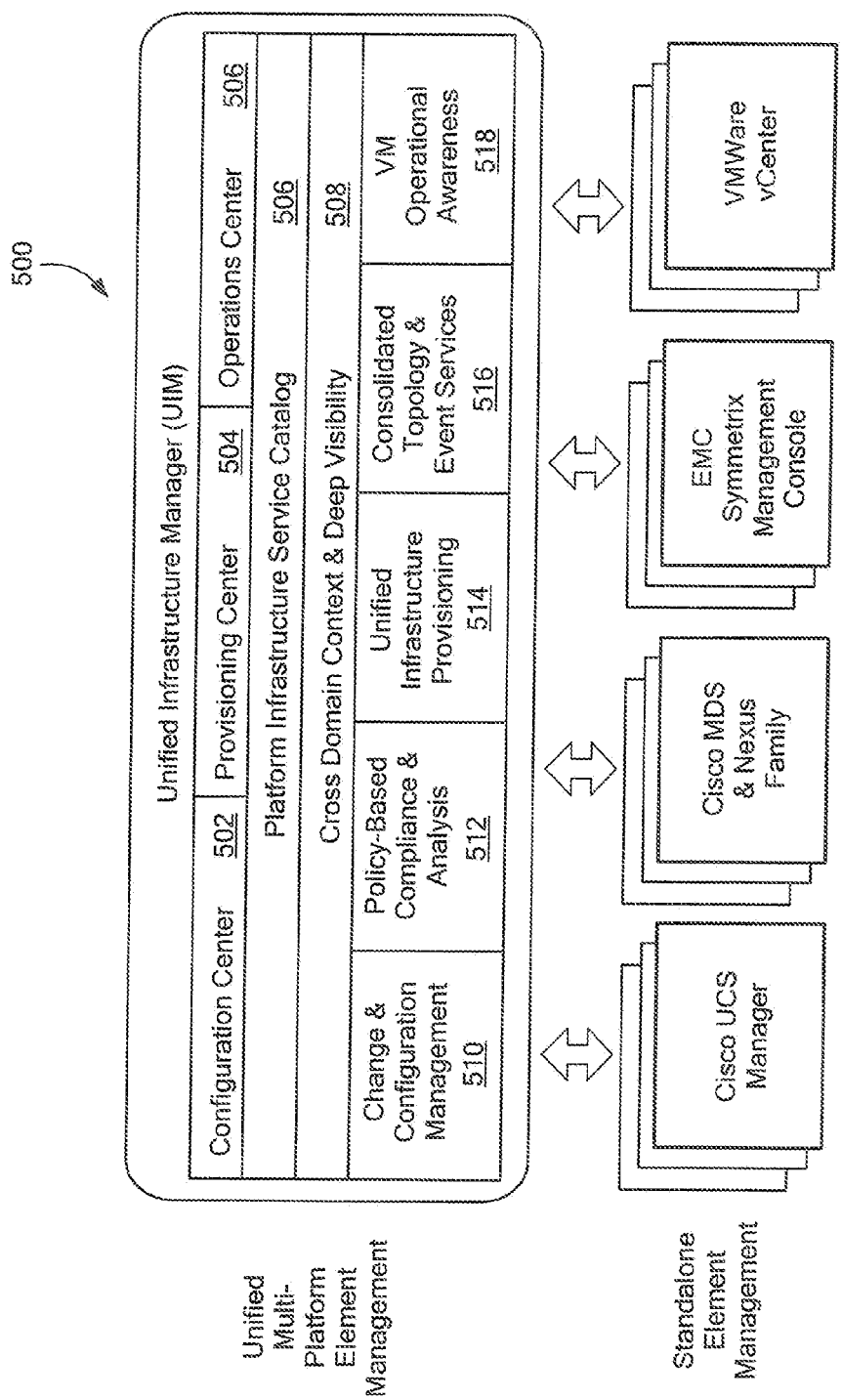
FIG. 5 is a schematic representation of a unified infrastructure manager (UIM) module showing component layering or stack.

FIG. 5 shows an exemplary unified infrastructure manager 500 having alert/event enrichment in accordance with exemplary embodiments of the invention. In one embodiment, the unified infrastructure manager 500 includes a configuration center module 502, a provisioning center module 504, and an operations center module 506. Below these modules, is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications.

The unified infrastructure manager 500 performs platform deployment by abstracting the overall provisioning aspect of the platform(s) and offering granular access to platform components for trouble shooting and fault management.

In one aspect of the invention, a uniform infrastructure management module includes an alert enrichment module to enrich alerts from platform events and alerts to physical infrastructure, logical services, virtual applications, and tenant/organizations. It is understood that cloud environments can provide storage for multiple tenants/organizations.

In general, a unified infrastructure management module includes functionality to receive events and alerts from platform components, identify them with and/or roll them up to manageable IT topological resources, enrich the events/alerts with physical infrastructure, logical service, virtual application, and/or tenant/organization information. Enriching events/alerts to the physical, logical, virtual and organizational layers enables users to place events/alerts in the context of organizations to help the IT organizations categorize them, define criticality, deliver the required SLA, and quickly isolate the alerts to the relevant physical or logical components for trouble-shooting.

Exemplary embodiments of the invention enable a unified infrastructure module to identify automatically the events and alerts from various platform components with the high level physical or logical IT resources, such as storage array, storage volume, blade, chassis, fabric interconnect, server, virtual machine, fibre channel switch, IP switch, and the like.

In addition, exemplary embodiments of the invention are useful to automatically enrich, when applicable, the platform alerts and events to relevant services configured in UIM/provisioning. The configuration and status change events from UIM/Provisioning are automatically enriched with the services. Exemplary embodiments of the invention are further useful to automatically enrich, whenever applicable, platform alerts and events to platform instances as represented in UIM/Provisioning, to virtual applications, such as applications represented in VMware vSphere, to organizations, such as those represented in VMware vCloud Director. Exemplary embodiments of the invention are further useful to automatically refresh the enrichment whenever the applicable conditions of platform have changed, for example, when services in UIM/Provisioning are commissioned or decommissioned.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a generic product, function, or module.

Some exemplary items are set forth below. It is understood that one of ordinary skill in the art is familiar with the generic architecture and functionality of a vendor specific terms.

UIM/Provisioning or UIM/P: EMC Unified Infrastructure Management/Provisioning that provides simplified management for VCE VBLOCK by managing the components of VBLOCK platforms as a single entity and easily define and create infrastructure service profiles to match business requirements.

Cisco UCS: Cisco Unified Computing System.

VMWARE VSPHERE: A virtualization platform for building cloud infrastructures

ESX/ESXi: An enterprise-level computer virtualization product offered by VMware.

VM: Virtual Machine

VBLOCK: A pre-architected and pre-qualified environment for virtualization at scale: storage, fabric, compute, hypervisor, management and security.

Model Service Adapter: A service that uses the RESTful interface to expose the types of resources and instances of the data sources.

vApp: Virtual Application vCD: VMware vCloud Director

Figure 6:
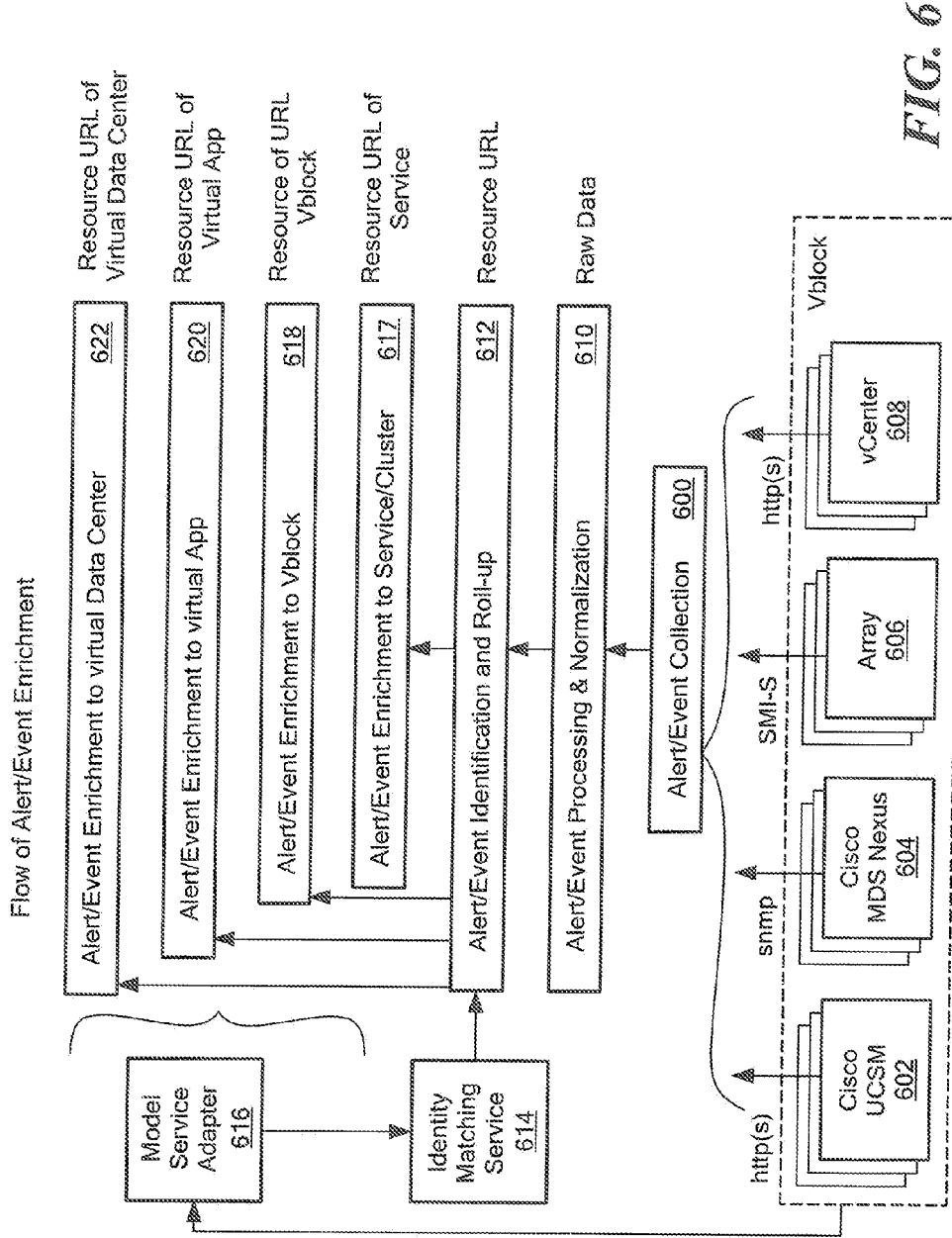
FIG. 6 is a flow diagram showing an exemplary sequence of steps for alert/event enrichment.

FIG. 6 shows an exemplary flow for enrichment of alert/events in a cloud storage environment. In general, the alerts/events are collected from platform components of via a variety of protocols, processed and normalized to a user-friendly model representation, identified and rolled up to high level resources, and enriched with logical services, physical infrastructure, virtual applications, and organizations.

As used herein, the term enriched means that alerts/events are related to the physical infrastructure, the logical services, the virtualization, and the businesses and organizations that rely on the infrastructure, the logical services, and virtualizations, and are associated with context of the cloud from which they originated.

Alert/event collection 600 collects alerts/events from various platform components, such as fabric switches 602, fabric interconnects 604, storage arrays 606, and platform applications 608. Alert/event processing and normalization 610 is performed on the raw data. Alert/event identification and roll-up 612 takes the processed alert/events and information from an identity matching service 614 to generate resource URLs. A model service adapter 616 coupled to the platform elements provides the identity information about the topology objects or abstractions to the identity matching service 614. The identity matching service reconciles managed/topology objects that are represented differently in one or more data sources.

In an exemplary embodiment, information from alert/event identification and roll-up 612 is provided to modules including an alert/event enrichment to service cluster 617, alert/event enrichment to platform 618, alert/event enrichment to virtual applications 620, and alert/event enrichment to virtual data center 622, each of which provides resource URL information for a respective platform, virtual application, or virtual data center.

Figure 7:
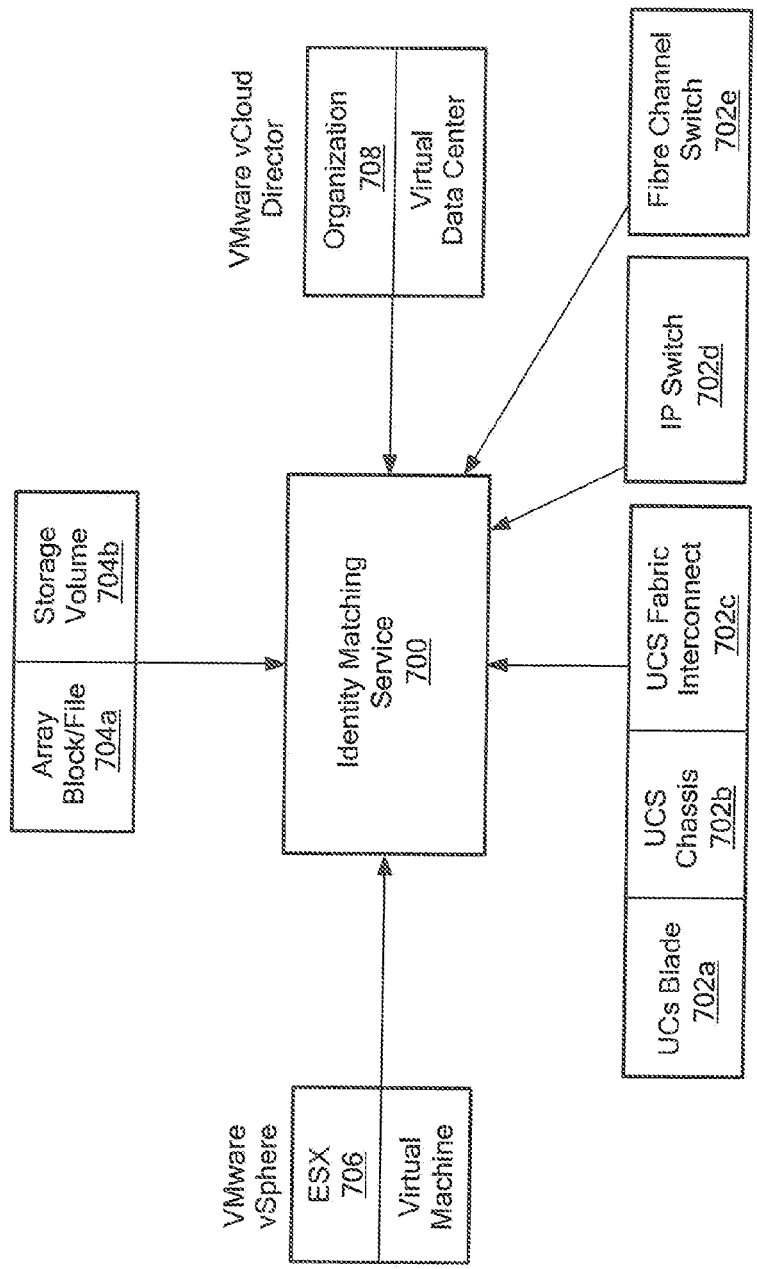
FIG. 7 is a schematic representation of an identify matching service.

FIG. 7 shows an exemplary embodiment of an identity matching service 700 for events/alerts. In general, the identity matching service retrieves from various model service adapters (MSA) the identity matching feed that contains the unique identifiers of resources and their resource URL that can be used to retrieve additional information of the resources from the MSA. The retrieval of identity matching feed can be done either by periodical polling and/or real time update. It then performs identity matching according to a few built-in rules.

As shown in FIG. 7, the identity matching service 700 receives events/alerts from platform components, such as blades 702a, chassis 702b, fabric interconnects 702c, IP switches 702d, and fibre channel switches 702e. The identity matching service receives event/alerts from storage layer components, such as an array 704a, and (logical) storage volume 704b. The identify matching service also receives events/alerts from the ESX/virtual machine 706. As is known in the art, ESX is an enterprise-level computer virtualization product offered by VMware, Inc. ESX is a component of VMware Infrastructure, which adds management and reliability services to the core server product. Further events/alerts can be generated by an organization/virtual data center 708, which can be provided as part of VMware vCloud Director.

The following table shows the resources type and their identifier.

| Resource Type | Identifiers |
| --- | --- |
| Array | Serial number, IP address, hostname |
| Storage Volume | Internal storage volume or LUN identifier, UUID |
| File System | Celerra Control Station IP + File system name |
| Datastore | Datastore name (= File system name) |
| DiskPartitionInfo in Datastore | UUID |
| ESX | IP address, hostname, MAC address, object ID in vSphere |
| Virtual Machine | IP address, hostname, object ID in vSphere |
| Cluster | Cluster name |
| UCS Blade | WWN, MAC address, Serial Number, UCS object ID |
| Fabric Interconnect | WWN, MAC address, hostname, IP address |
| Fibre Channel Port in Fabric Interconnect | UCS object ID |
| IP Switch | Hostname, IP address, MAC address |
| Fibre Channel Switch | Hostname, IP address, WWN |
| Fibre Channel Port in Fibre Channel Switch | Switch IP + Object ID |
| VSAN | Switch IP + VSAN ID |
| Provider vDC | Internal Object ID |
| UCS Chassis | UCS object ID |

A client can retrieve match results, such as a set of resource URLs, from the identity matching service in a number of ways. For example, given a resource URL, the client returns URLs of matched resources. Also, given identifiers of a resource, a client returns the URLs of matched resources. For example, an alert from Cisco UCS Manager contains the UCS Chassis object ID. The enrichment engine sends a request with the object ID to the identity matching service 700. Once matches are found, the service returns the resource URL of the chassis.

As will be readily understood by one of ordinary skill in the art, there are normally multiple representations or perspectives of the same physical or logical resources. And each perspective is created for particular purposes in a particular domain to fulfill particular requirements. And each perspective can be managed by different management solutions and may generate its own alerts and events.

The following tables illustrate the cross domain identity matching between blades on Cisco UCS, the VMware ESX server deployed on the blade, and UIM blade representation for provisioning purpose. The matching is achieved within the identity matching service via the following rules:

The UCS Blade is matched with UIM Blade via either UCS object ID or serial number;

The ESX in vSphere is matched with UCS blade via MAC address;

The matching rule is transitive, i.e., if A matches B, and B matches C, then A matches C.

| Domain | Cisco UCS | VMware vSphere | UIM/Provisioning |
| --- | --- | --- | --- |
| Resource Identifiers | Blade<br>UCS object ID (id), MAC Address (mac), Serial Number (sn) | ESX<br>MAC Address (mac), FQDN | UIM_Blade<br>UCS Object ID, Serial Number |
| Example | id: sys/chassis-1/blade-2,<br>mac: 00:26:51:08:F3:89,<br>sn: QCI133400G5 | mac: 00:26:51:08:F3:89<br>FQDN: example.emc.com | id: sys/chassis-1/blade-2<br>sn: QCI133400G5 |

The following table illustrates the cross domain identity matching between the storage volume or LUN on storage arrays and the datastore in VMware vSphere.

| Domain | Storage | vSphere |
|---|---|---|
| Resource type | Storage Volume [LUN] | Datestore |
| Identifiers | UUID | UUID |
| Examples | 60:06:01:60:3B:40:2D:00:42:2E:06:59:4F:62:E1:11 | naa.600601603b402d00422e06594f62e111 |

Figure 8:
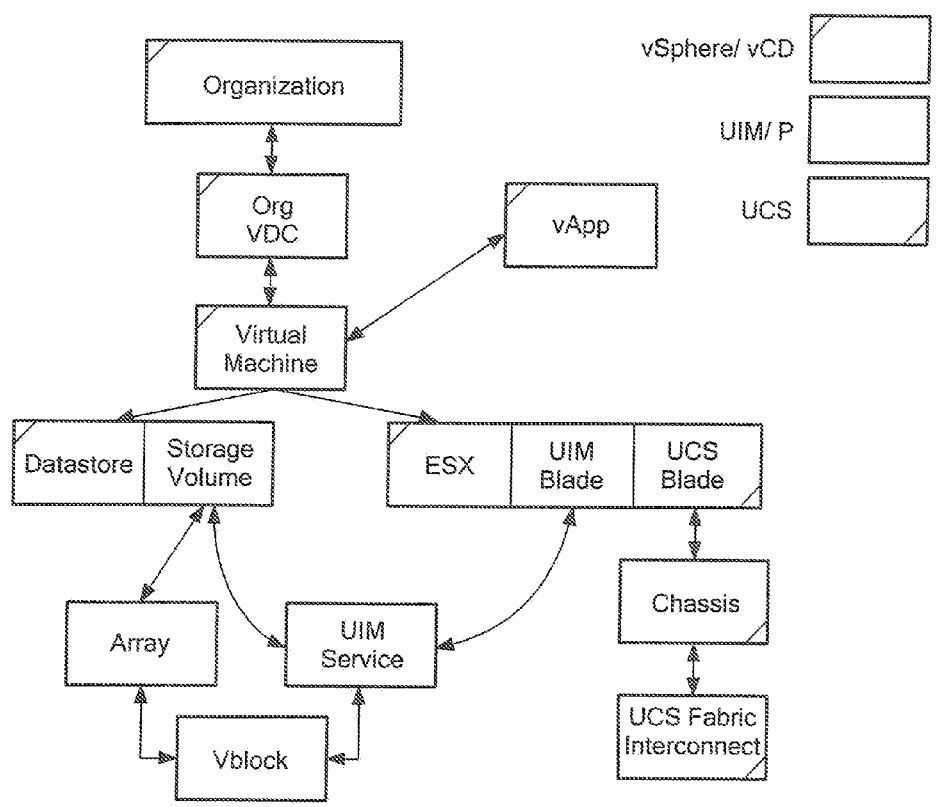
FIG. 8 is a schematic representation of resource relationships.

As discussed above, a platform such as VBLOCK, can comprise components for storage, network, computing and virtualization bound together by technologies from various vendors. As illustrated from the high level resource diagram of FIG. 8, multiple domains and vendor technologies are put together via cross domain identity matching as illustrated by the two examples below: ESX, UIM Blade, UCS Blade; and Storage Volume and Datastore. By following the relationships shown in FIG. 8, an alert can be associated or enriched to various managed resources. For example, when a health alert is generated on a chassis in UCS, it can be enriched by following the path from UCS Blade to UIM Blade to Vblock, or to ESX to Virtual Machine to vDC to Organization. Without the cross domain identity matching, the alert would be viewed in the context of UCS and it may not provide the IT personnel enough information to take proper action.

The following table illustrates how the alerts are identified with high level resources. Specific identifiers in various types of alerts or events from multiple sources are automatically selected, and requests are made to the identity matching service to match with high level resources.

| Alert Source | Identifier | Example of Raw alert | High Level Resource |
|---|---|---|---|
| Cisco UCS Manager | AffectedElement | \|affectedElement\|sys/chassis-2/blade-6\|transaction\|ONSET\|severity\|1\|ack\|no\|cause\|fsm-failed\| | UCS Blade |
| Cisco UCS Manager | AffectedElement | \|affectedElement\|sys/chassis-3/slot-1\|transaction\|ONSET\|severity\|2\|ack\|no\|cause\|rule\|equipment-iocard-post-failure\| | Chassis |
| VMware vSphere | entityMORType, entityMORVal | \|alarmName\|Host connection and power state\|entityMORType\|HostSystem\|entityMORVal\|host-1191\|entityName\|lgly4194.lss.emc.com\|overallStatus\|red\| | ESX |
| VMware vSphere | hostMORType, hostMORVal | \|eventClass\|HostConnectionLostEvent\|hostMORType\|HostSystem\|hostMORVal\|host-2235\|hostName\|lglom129.lss.emc.com\| | ESX |
| VMware vSphere | entityMORType, entityMORVal | \|alarmName\|Datastore usage on disk\|entityMORType\|Datastore\|entityMORVal\|datastore-1220\|entityName\|200M1-1Blade-Esxi41_data2\|overallStatus\|yellow\| | Datastore |
| Storage Array, SMI-S Indication | ClassName, DeviceID, SystemName | OSLS_InstCreation AgentIP = 172.23.145.209 ClassName = Clar_StorageVolume DeviceID = 00200 SystemName = CLARiiON + FNM00084200133 | Storage-Volume |

The logical services, defined in UIM/Provisioning as UIM Service and sometimes equivalent to the cluster in VMware vSphere, are the building blocks of Infrastructure as a service (IaaS). The alerts or events are then enriched with logical services (UIM Service) by following the relationships in FIG. 8.

Figure 9:
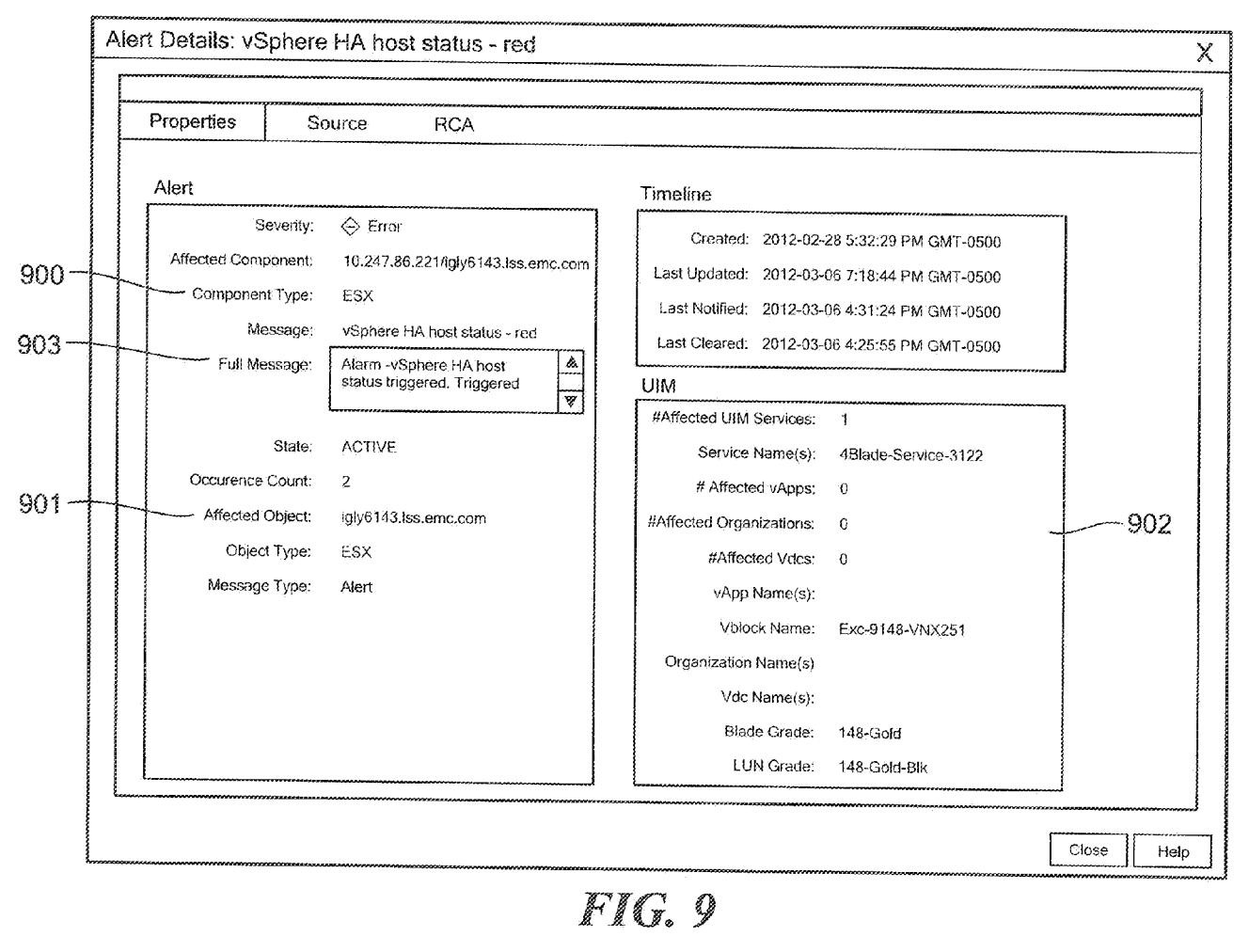
Figure 10:
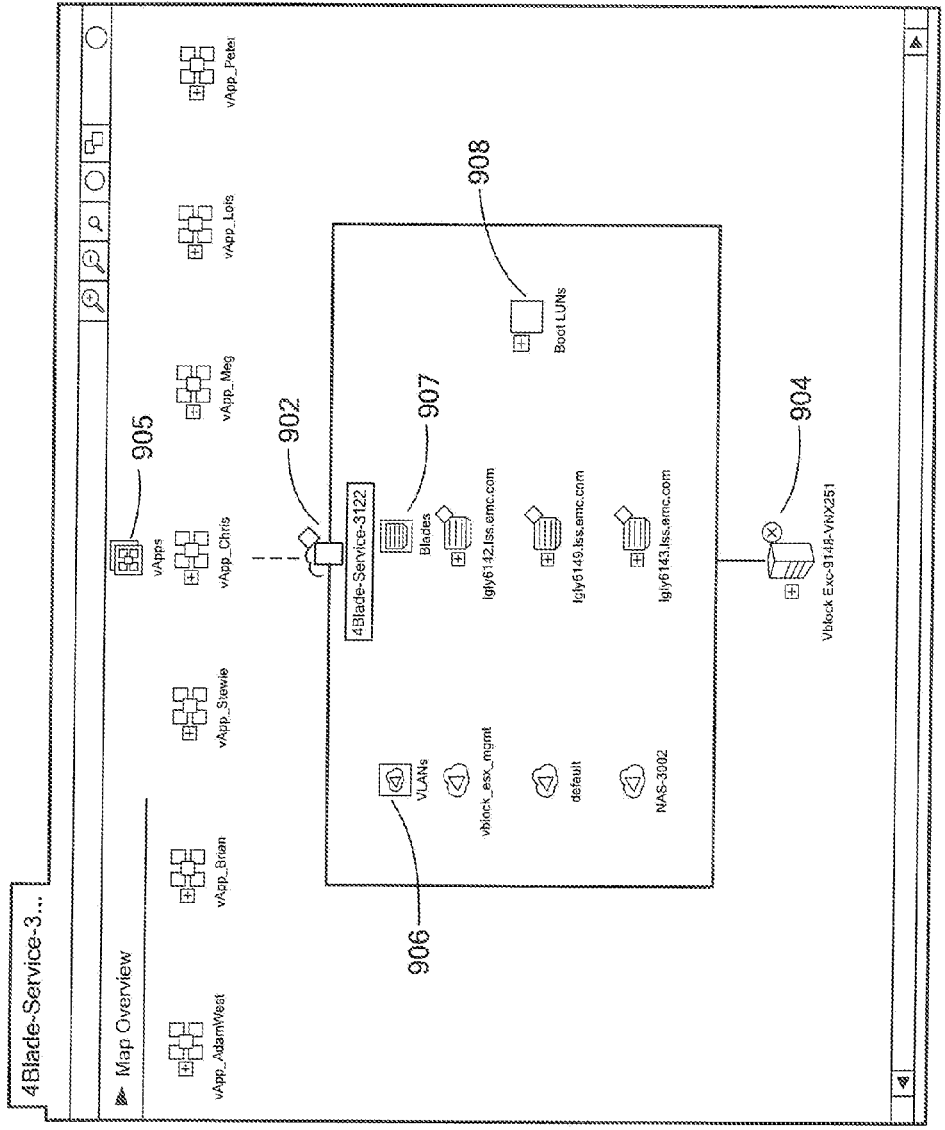
FIG. 10 is an exemplary display of the alert of FIG. 9 enriched.

FIG. 9 shows an ESX alert enriched with logical service. The alert, "vSphere HA host status triggered" 903, is first identified as originated from a resource of type "ESX" 900 with identifier 10/247.66.221/1g1oy6143.lss.emc.com 901. It is then enriched with "4Blade-Service-3122" 902. Following the link in Service Name(s) 902, "4Blade-Service-3122", shows the service map in FIG. 10. It provides the context of the network VLANs 906, storage LUNs 908 and computing blades 907 within the service, as well as the physical infrastructure Vblock "Exc-9148-VNX251" 904 and the virtual applications (vApp) the this service supports 905.

Figure 11:
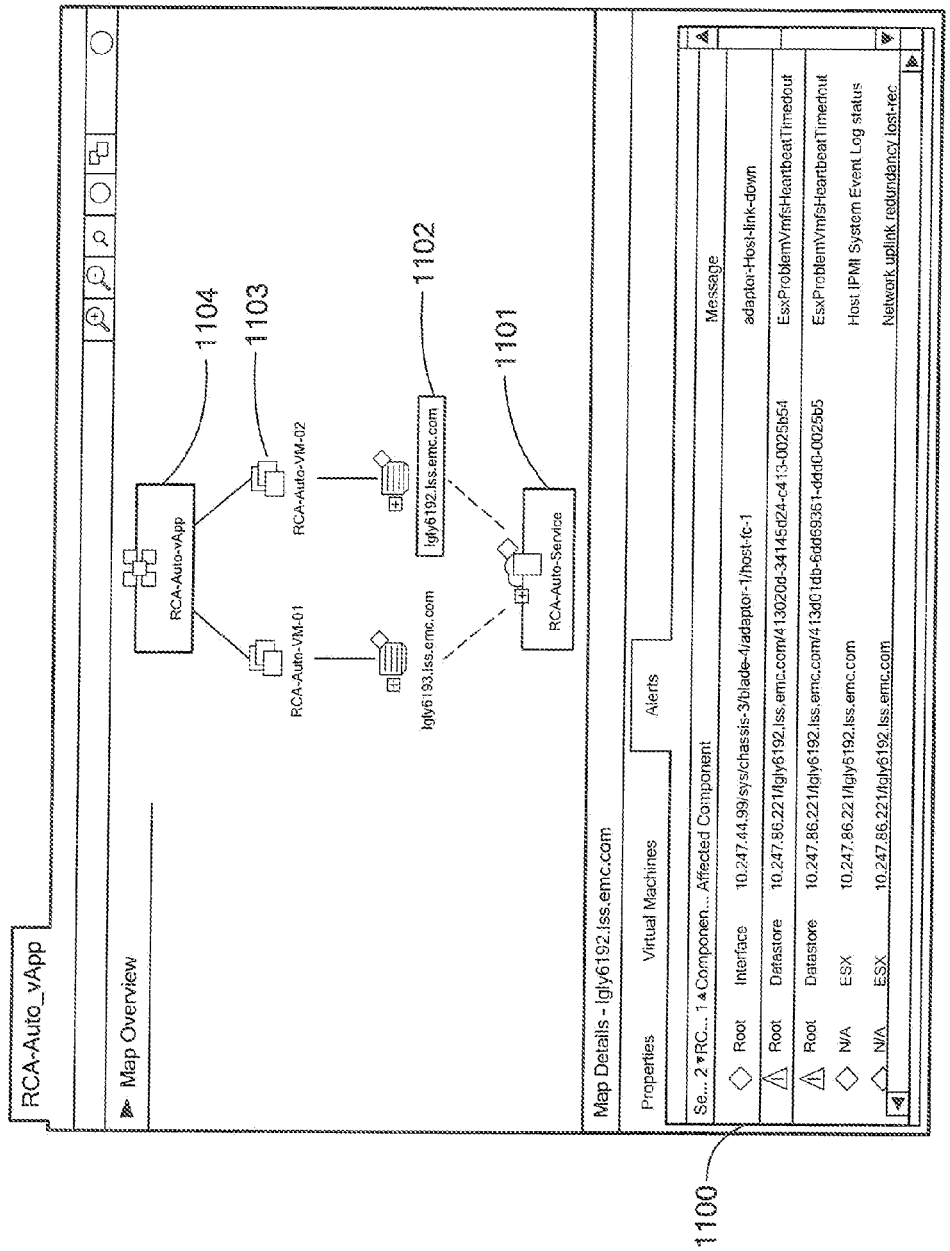
FIG. 11 is an exemplary display for a datastore alert enriched with virtual application.

FIG. 11 shows a datastore alert from vSphere enriched with virtual application (vApp) and logical service. A datastore alert 1100 is identified to be related to computing blade and ESX host "1g1y6192.lss.emc.com" 1102. The ESX host is part of the logical service "RCA-Auto-Service" 1101. The virtual machine "RCA-Auto-VM-02" 1103 runs on the ESX host and it is part of the virtual application "RCA-Auto-vApp" 1104.

Figure 12:
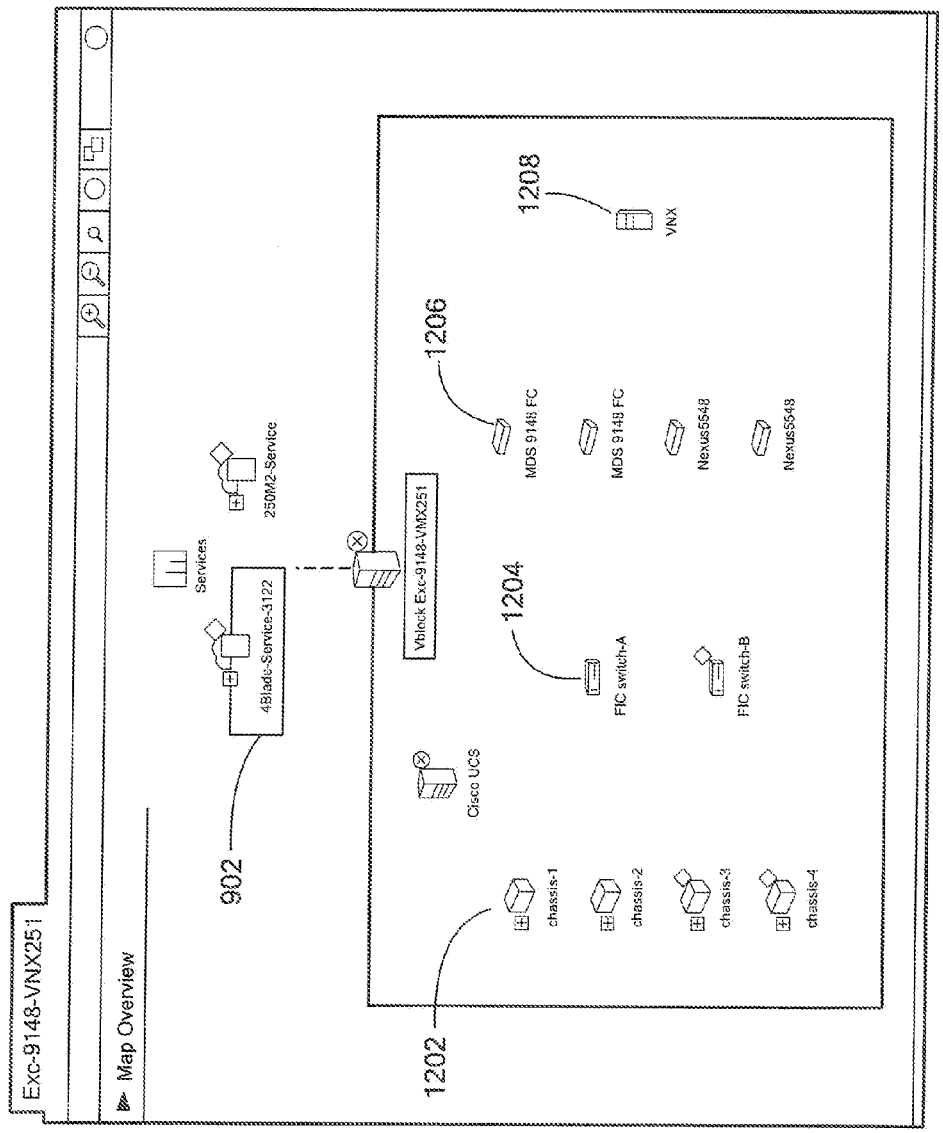
FIG. 12 is an exemplary display of physical infrastructure for the alert of FIG. 9.

FIG. 12 shows the physical infrastructure, the platform, e.g., Vblock, with which the alert in FIG. 9 is enriched. The various platform components are shown, such as the chassis 1202, FC switches 1204, computer components 1206, and storage components 1208.

Figure 13A:
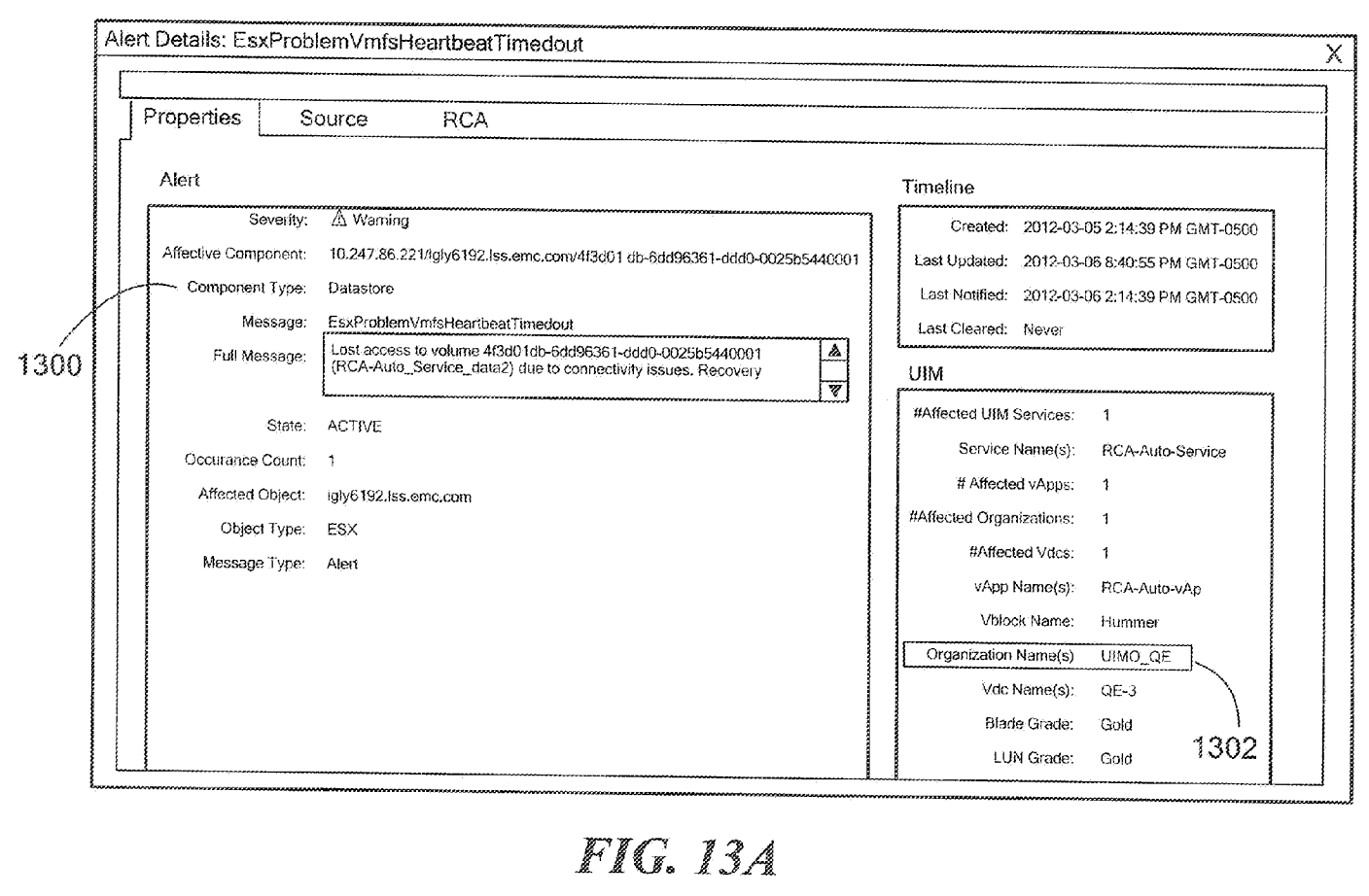
Figure 13B:
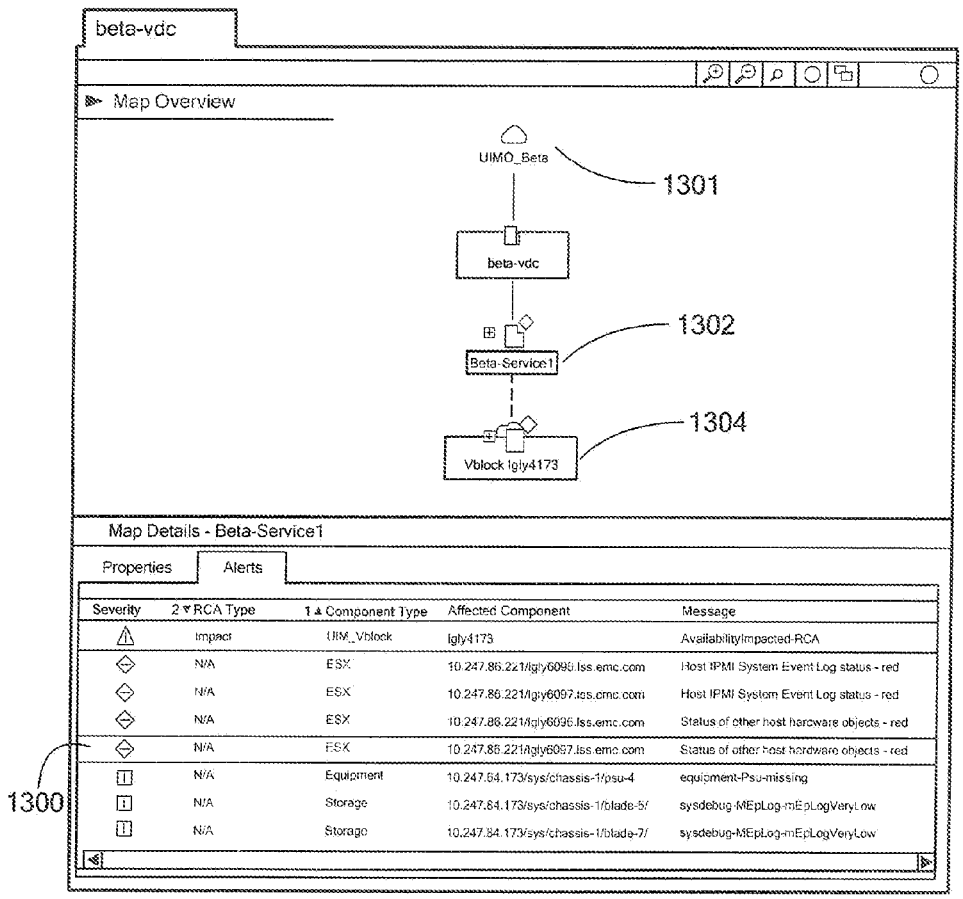

FIG. 13A shows an ESX host alert enriched with organization information, together with infrastructure (Vblock) and logical service. As shown in FIG. 13B, an alert on ESX host "1g1y6097.lss.emc.com" 1300 is reported, and it is enriched to organization "UIMO_Beta" 1301, the logical service "Beta-Service1", and physical infrastructure Vblock "Vblock 1g1y3173" 1304.

Figure 14:
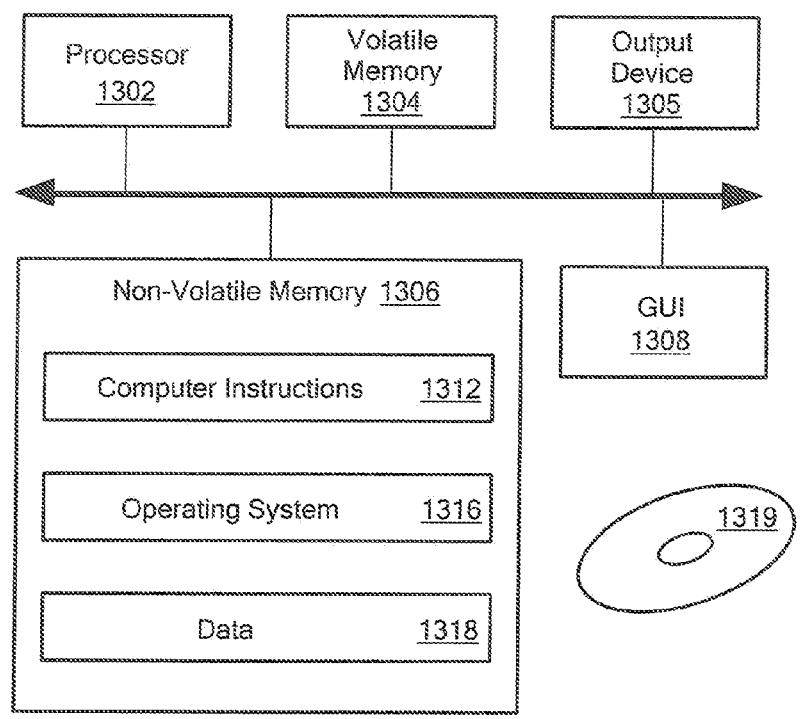
FIG. 14 is a schematic representation of an exemplary computer that can perform at least some of the processing described herein.

FIG. 14 shows an exemplary computer that can perform at least a part of the processing described herein. A computer includes a processor 1302, a volatile memory 1304, an output device 1305, a non-volatile memory 1306 (e.g., hard disk), and a graphical user interface (GUI) 1308 (e.g., a mouse, a keyboard, a display, for example). The non-volatile memory 1306 stores computer instructions 1312, an operating system 1316 and data 1318, for example. In one example, the computer instructions 1312 are executed by the processor 1302 out of volatile memory 1304 to perform all or part of the processing described above. An article 1319 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
  receiving alerts/events from components of a cloud storage system comprising fabric switches, fabric interconnects, storage arrays, platform applications, storage layer components, arrays, logical storage, and virtual machines;
  processing, using a computer processor, raw data for the alerts/events;
  performing alert/event identification with information from an identity matching service for the components of the cloud storage system to generate a resource identifier for the component associated with a first one of the processed alerts/events;
  using the resource identifier to identify a service, platform, virtual machine, virtual application, virtual data center, organization and/or platform component associated with the first one of the processed alerts/events;
  wherein a first one of the components is identified in at least two of a storage domain, a network domain, a computing domain, and a virtualization domain;
  performing cross domain matching between the at least two domains; and
  enriching the alert/event with a logical service to provide a context within the logical service.

2. The method according to claim 1, wherein the resource identifier includes an URL (uniform resource locator).

3. The method according to claim 1, wherein the resource identifier can comprise one or more of a serial number, IP address, hostname, LUN (logical unit number) identifier, UUID (universally unique identifier), MAC (media access control) address, object ID, and WWN (world wide name).

4. The method according to claim 3, wherein the resource identifier is selected based upon a domain of the resource.

5. The method according to claim 1, further including enriching a virtualization alert with logical service.

6. The method according to claim 5, further including generating a service map for the virtualization alert to provide context of network, storage and compute layers.

7. The method according to claim 1, further including enriching a datastore alert with virtual application.

8. The method according to claim 1, further including enriching a datastore alert with organization.

9. The method according to claim 1, wherein the platform component comprises at least one of fabric switches, fabric interconnects, and storage arrays.

10. An article, comprising:
  a non-transitory computer readable medium having stored instructions that enable a machine to perform:
    receiving alerts/events from components of a cloud storage system comprising fabric switches, fabric interconnects, storage arrays, platform applications, storage layer components, arrays, logical storage, and virtual machines;
    processing, using a computer processor, raw data for the alerts/events;
    performing alert/event identification with information from an identity matching service for the components of the cloud storage system to generate a resource identifier for the component associated with a first one of the processed alerts/events; and
    using the resource identifier to identify a service, platform, virtual machine, virtual application, virtual data center, organization and/or platform component associate with the first one of the processed alerts/events;
    wherein a first one of the components is identified in at least two of a storage domain, a network domain, a computing domain, and a virtualization domain;
    performing cross domain matching between the at least two domains; and
    enriching the alert/event with a logical service to provide a context within the logical service.

11. The article according to claim 10, wherein the resource identifier can comprise one or more of a serial number, IP address, hostname, LUN (logical unit number) identifier, UUID (universally unique identifier), MAC (media access control) address, object ID, and WWN (world wide name).

12. The article according to claim 11, wherein the resource identifier is selected based upon a domain of the resource.

13. The article according to claim 10, further including instructions for enriching a virtualization alert with logical service.

14. The article according to claim 13, further including instructions for generating a service map for the virtualization alert to provide context of network, storage and compute layers.

15. The article according to claim 10, further including instructions for enriching a datastore alert with virtual application.

16. The article according to claim 10, further including instructions for enriching a datastore alert with organization.

17. A system, comprising:
  a cloud storage system comprising:
    a computer layer;
    a storage layer;
    a network layer coupled between the computer and storage layer; and
    a management layer to control the cloud storage system, the management layer comprising stored instructions to enable the management layer to:
  receive alerts/events from components of the cloud storage system comprising fabric switches, fabric interconnects, storage arrays, platform applications, storage layer components, arrays, logical storage, and virtual machines;
  process raw data for the alerts/events;
  perform alert/event identification with information from an identity matching service for the components of the cloud storage system to generate a resource identifier for the component associated with a first one of the processed alerts/events;

use the resource identifier to identify a service, platform, virtual machine, virtual application, virtual data center, organization and/or platform component associate with the first one of the processed alerts/events;

wherein a first one of the components is identified in at least two of a storage domain, a network domain, a computing domain, and a virtualization domain;

perform cross domain matching between the at least two domains; and enrich the alert/event with a logical service to provide a context within the logical service.

* * * * *